(12) United States Patent
Arensmeier

(10) Patent No.: US 10,738,385 B2
(45) Date of Patent: Aug. 11, 2020

(54) METHOD AND SYSTEM FOR CONTROLLING POWERED ANODE DRIVE LEVEL

(71) Applicant: Emerson Electric Co., St. Louis, MO (US)

(72) Inventor: Jeffrey N. Arensmeier, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 406 days.

(21) Appl. No.: 15/858,268

(22) Filed: Dec. 29, 2017

(65) Prior Publication Data

US 2019/0203363 A1  Jul. 4, 2019

(51) Int. Cl.

| C23F 13/04 | (2006.01) |
| C23F 13/22 | (2006.01) |
| G05B 19/042 | (2006.01) |
| F24H 9/00 | (2006.01) |

(52) U.S. Cl.
CPC .............. *C23F 13/04* (2013.01); *C23F 13/22* (2013.01); *F24H 9/0047* (2013.01); *G05B 19/042* (2013.01); *C23F 2213/10* (2013.01); *C23F 2213/30* (2013.01); *G05B 2219/25268* (2013.01)

(58) Field of Classification Search
CPC ........................ C23F 13/04; C23F 13/22; C23F 2213/10–11; F24H 9/0047; G05B 19/042
See application file for complete search history.

(56) References Cited

U.S. PATENT DOCUMENTS

| 3,126,469 A | 3/1964 | Feldmann et al. |
| 3,132,082 A | 5/1964 | Overmyer |
| 4,975,560 A | 12/1990 | Wardy et al. |
| 7,372,005 B2 | 5/2008 | Knoeppel et al. |
| 9,335,065 B2 | 5/2016 | Farris et al. |
| 9,372,012 B2 | 6/2016 | Farris |
| 9,657,965 B2 | 5/2017 | Nolte et al. |
| 2014/0218006 A1 | 8/2014 | Gross et al. |
| 2017/0193794 A1 | 7/2017 | Farris et al. |

FOREIGN PATENT DOCUMENTS

EP    2610369 A2 *  7/2013  ............. C23F 13/04

* cited by examiner

*Primary Examiner* — Alexander W Keeling
(74) *Attorney, Agent, or Firm* — Armstrong Teasdale LLP

(57) ABSTRACT

A system and methods of controlling a powered anode are disclosed. The method includes varying an electrical power input driving the powered anode through a range of values of a first electrical parameter, the range defined by an upper range limit and a lower range limit and measuring a current value of a second electrical parameter of the electrical power input during the varying. The method also includes determining a slope between the measured current values of the first and corresponding second electrical parameters and measured previous values of the first and second electrical parameters and comparing the determined slope to a predetermined slope threshold range and applying the current value of a first electrical parameter to the electrical power input when a discontinuity in the slope is determined.

13 Claims, 8 Drawing Sheets

METHOD AND SYSTEM FOR CONTROLLING POWERED ANODE DRIVE LEVEL

FIELD

This disclosure relates generally to cathodic protection systems, and, more particularly, to an anode drive system for a fluid vessel.

BACKGROUND

Anodes, either active or powered, or passive (sacrificial) are used to limit, control, and/or prevent galvanic corrosion damage to the tank of water heaters and other metal water vessels. Both passive and active systems protect the tank by being a more active anode than the tank. Passive or sacrificial systems generally use magnesium (Mg) and/or aluminum (Al) rods electrically coupled to the tank. This anode rod is consumed in the process of protecting the tank, hence the use of the term sacrificial. Active systems generally employ a permanent anode rod that typically includes, for example, a titanium alloy. The rod is connected to a power supply which applies the current necessary to null the galvanic effect. Insufficient current provides insufficient protection, excessive current may result in corrosion of other components. Greatly excessive current may result in the production of unacceptable amounts of hydrogen gas. As tank and water conditions vary, the current needed to protect the tank varies. Ideally, the anode current level would be that needed to exactly or substantially null the galvanic effect.

Simple powered anode systems often used a fixed current based on a vessel's size which provided some general level of protection, but could not adjust for varying tank and water conditions. Fixed current systems cannot adjust for tank lining deterioration, various water conditions and other changes over time and installation location.

This Background section is intended to introduce the reader to various aspects of art that may be related to the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a method of controlling a powered anode includes varying an electrical power input driving the powered anode through a range of values of a first electrical parameter, the range defined by an upper range limit and a lower range limit and measuring a current value of a second electrical parameter of the electrical power input during the varying. The method also includes determining a slope between the measured current values of the first and corresponding second electrical parameters and measured previous values of the first and second electrical parameters and comparing the determined slope to a predetermined slope threshold range and applying the current value of a first electrical parameter to the electrical power input when a discontinuity in the slope is determined.

In another aspect, a method of controlling a powered anode in a vessel includes varying an electrical power input driving a powered anode through a range of values of a first electrical parameter, the range defined by an upper range limit and a lower range limit and measuring values of a plurality of electrical parameters of the electrical power input during the varying. The method also includes plotting a trace of values of a first electrical parameter of the plurality of electrical parameters of the electrical power input with corresponding values of a second electrical parameter of the plurality of electrical parameters of the electrical power input and determining a slope of the trace at a plurality of points on the trace. The method further includes identifying a discontinuity on the trace and applying the electrical power input that corresponds to the identified discontinuity to the powered anode.

In yet another aspect, a powered anode drive control system includes an anode drive power supply and a powered anode positionable in a fluid-filled vessel and electrically couplable to the anode drive power supply. The powered anode drive control system also includes an anode drive controller including one or more processors communicatively coupled to one or more memory devices. The one or more processors are communicatively couplable to an anode drive current sensor and an anode drive voltage sensor communicatively coupled to the anode drive controller and the anode drive power supply. The one or more processors are configured to vary an electrical power input driving the powered anode through a range of values of a first electrical parameter, the range defined by an upper range limit and a lower range limit and measure a current value of a second electrical parameter of the electrical power input while the electrical power input is being varied. The one or more processors are also configured to determine a slope between the measured current values of the first and corresponding second electrical parameters and measured previous values of the first and second electrical parameters, compare the determined slope to a predetermined slope threshold range, and apply the current value of a first electrical parameter to the electrical power input when at least one of a change in a value of the slope exceeds the predetermined slope threshold range and a change of polarity of the value of the slope occurs.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 1 is a schematic block diagram of cathodic protection system including a powered anode and an anode control circuit.

FIG. 2 is a schematic diagram of anode control circuit in accordance with an example embodiment of the present disclosure.

FIG. 3 is a graph of vessel voltage versus anode current for a powered anode such as, powered anode shown in FIGS. 1 and 2.

FIG. 4 is a flowchart of main program component.

FIG. 5 is a flowchart of a measurement component.

FIG. 6 is a flowchart of a slope find component.

FIG. 7 is a flowchart of a measurement control component.

FIG. 8 is a flowchart of a notch find component.

Figure 1:
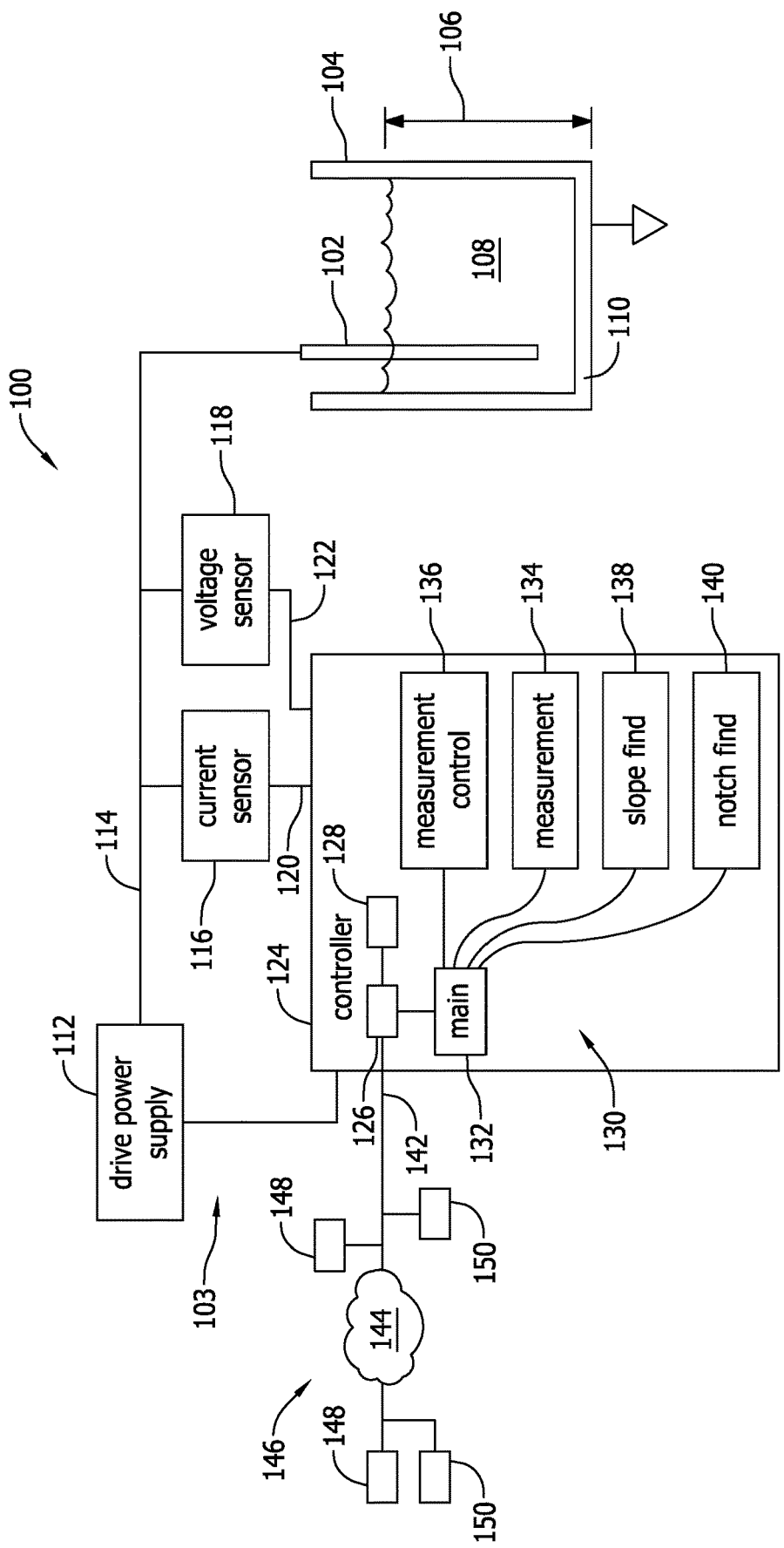
FIGS. 1-8 show example embodiments of the methods and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to corrosion protection in industrial, commercial, and residential applications.

Embodiments of a cathodic protection anode drive system are described herein. For example, a non-sacrificial anode is positioned within a vessel, such as, but not limited to a water heater and the anode is electrically coupled to a drive circuit, which, as closely as possible, counter-balances the drive voltage of the anode to the cathodic demands of the vessel. To be effective the drive voltage is varied over time to match changing conditions within the vessel. Such conditions include, but are not limited to, changes in fluid chemistry, changes in fluid temperature, changes in fluid level in the vessel, and combinations of the above. The method of operation of the system is based on an observable notch in a current/voltage curve for anode current. As the anode drive input voltage is varied, the current and voltage are measured, graphed or traced onto a graph, and a slope of the trace is calculated. At a balance point of the electrical response of the anode to the conditions, a notch is observed (change of sign or large change in slope). Once the balance point is found the anode drive system varies the drive voltage about that observed point and continue to adjust the drive to match the balance point as; the ionic content of the water drops, fresh water enters the tank, the tank's glass lining deteriorates, etc. Additionally, the anode drive system finds the balance point for various water conditions and tank sizes. In cases where multiple slope discontinuities may be observed, the highest voltage discontinuity is selected to be the balance point.

The electrical equivalent of the water, tank and anode can be modeled and a trace of its response graphed.

Calibrated values of the voltages and currents are not required because the goal is to find a change in the slope, not a certain value. This allows general purpose components to be used and does not require a calibration to be performed. Considerable drift is also tolerable.

Several variations of the control scheme provided by the anode drive system are possible. Once a notch is found, the voltage may be fixed for a time and then another sweep initiated or the voltage may be varied continuously about the notch to track changes in the cathodic balance point. Although the embodiments described herein depict one methodology of reading the voltages, currents determining the slope and finding the discontinuity or notch, other process steps are usable to accomplish the methodology. For example, the slope may also be calculated at each voltage step rather than as a separate operation described.

The following description refers to the accompanying drawings, in which, in the absence of a contrary representation, the same numbers in different drawings represent similar elements.

FIG. 1 is a schematic block diagram of cathodic protection system 100 including a powered anode 102 and an anode control circuit 103. In the example embodiment, powered anode 102 is physically mounted at least partially within a tank or vessel 104. Typically, vessel 104 has a level 106 of a fluid 108 contained within. Level 106 may be a variable parameter or rather may be maintained relatively constant. Additionally, fluid 108 may have chemical properties that change overtime that affect an ionic content of fluid 108. Vessel 104 may be lined with a coating and/or a layer of, for example, glass 110. Glass 110, over time may develop cracks or other indications that can permit fluid 108 to come into contact with vessel 104.

Anode 102 is electrically coupled to a drive power supply 112 that is configured to supply electrical power to anode 102 through a conduit 114. Drive power supply 112 may operate to supply anode 102 with a pulse width modulated (PWM) electrical supply that permits varying a voltage and power to anode 102. A current sensor 116 and a voltage sensor 118 generate a sensed current signal 120 and a sensed voltage signal 122, which are both channeled to a controller 124. Controller 124 controls drive power supply 112 using sensed current signal 120 and sensed voltage signal 122. Although described above with respect to a current sensor and a voltage sensor, in other embodiments, sensors capable of sensing and/or measuring other electrical parameters being supplied from drive power supply 112 to anode 102 may be used.

Controller 124 includes one or more processors 126 communicatively coupled to one or more memory devices 128. One or more executable program components 130 are stored in one or more memory devices 128 for retrieval and execution by one or more processors 126. In the example embodiment, one or more executable program components 130 includes a main program component 132, a measurement control component 136, a measurement component 134, a slope find component 138, and a notch find component 140. In some embodiments, a smaller number of the one or more executable program components 130 may be used, or additional executable program components 130 may be used. Cathodic protection system 100 may include or be communicatively coupled to a network 142 including, for example, the Internet 144. Network 142 may include a client/server environment 146 where a server 148 provides services to a plurality of client devices 150.

Figure 2:
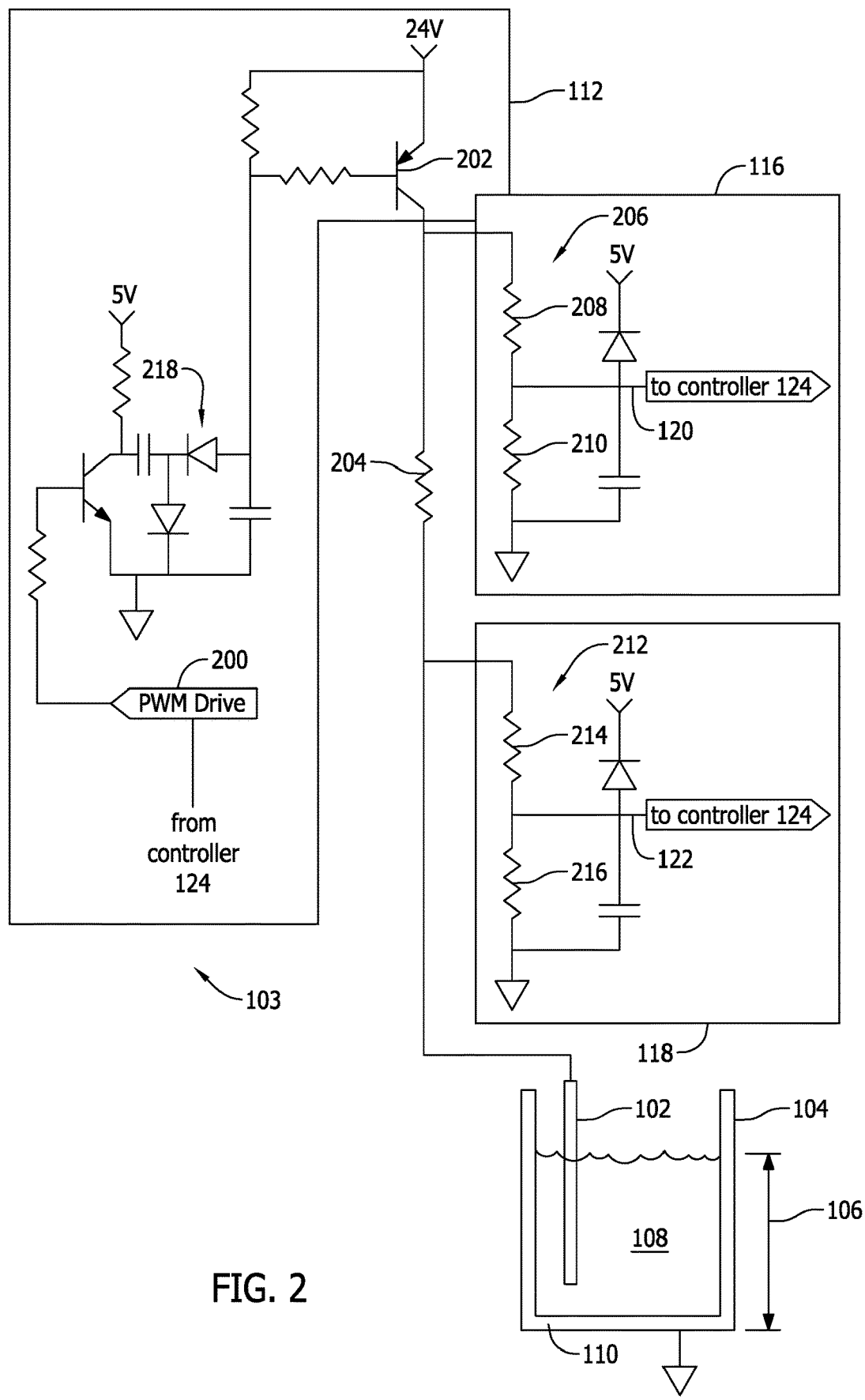

FIG. 2 is a schematic diagram of anode control circuit 103 in accordance with an example embodiment of the present disclosure. In the example embodiment, drive power supply 112 includes a pulse width modulated (PWM) electrical supply 200. Drive power supply 112 includes a driver transistor 202, series resistor/current reading shunt 204, a first voltage divider network 206 that includes a resistor 208 and a resistor 210, a second voltage divider network 212 that includes a resistor 214 and a resistor 216, and a level translation and filter block 218 for the PWM signal. Driver transistor 202 serves to control the voltage applied. Resistor 204 serves to provide a voltage reading proportional to the current supplied to anode 102 and to limit current in the event of a failure of transistor 202. Resistors 208-216 form voltage dividers to reduce the voltage to levels appropriate for processor 126.

During operation, controller 124 controls PWM electrical supply 200 to sweep a voltage or current applied to anode 102 over a span between an upper range limit and a lower range limit. Signals from current sensor 116 and voltage sensor 118 are transmitted to controller 124 where a slope of the current values of anode current and tank voltage is determined with respect to historical values of anode current and tank voltage. Controller 124 then identifies a notch or discontinuity of the slope to determine the optimum current level for anode 102. As used herein, discontinuity refers to a relatively large change in slope, for example, a change of greater than 20 percent or a change of sign of the slope. The notch is an observable change in the slope of the current vs voltage trace determined by controller 124 and based on inputs from current sensor 116 and voltage sensor 118. The change in slope is either in the form of a change in a magnitude of the slope or the sign of the slope.

Figure 3:
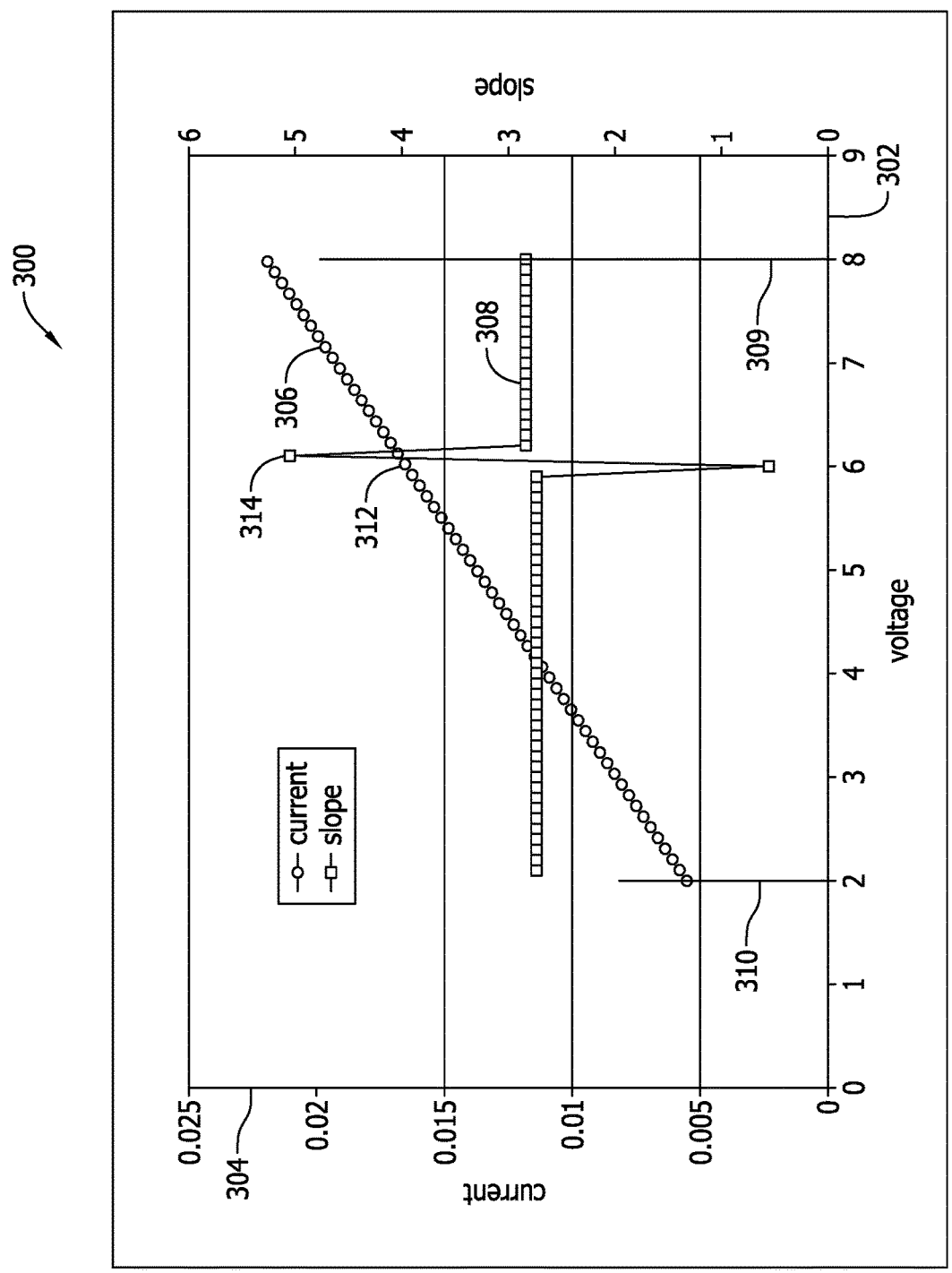

FIG. 3 is a graph 300 of vessel voltage versus anode current for a powered anode such as, powered anode 102 (shown in FIGS. 1 and 2). In the example embodiment, graph 300 includes an x-axis 302 graduated in units of voltage and a y-axis 304 graduated in units of anode current. A trace 306 illustrates a response of anode current to tank voltage being swept through a plurality of values between an upper range limit 309 and a lower range limit 310. A trace 308 illustrates a slope of trace 306. In one embodiment, trace 308 illustrates a slope of adjacent points on trace 306. For example, because a slope of trace 306 is approximately constant between upper range limit 309 and lower range limit 310, trace 308 is mostly constant. An exception occurs at approximately voltage unit 6 where a relatively small perturbation in trace 306 occurs. This small change 312 in current at approximately voltage unit 6 causes a large discontinuity or notch 314 in trace 308. As described herein, notch 314 is the characteristic that cathodic protection system 100 uses to determine a balance point for galvanic protection of vessel 104. Once notch 314 is identified, cathodic protection system 100 may adjust the upper range limit 309 and/or lower range limit 310 to be closer to voltage unit 6 where notch 314 occurred. Narrowing a span between upper range limit 309 and lower range limit 310 permits more efficient use of cathodic protection system 100 in that sweeping through adjusted upper range limit 309 and lower range limit 310 takes less time.

Figure 4:
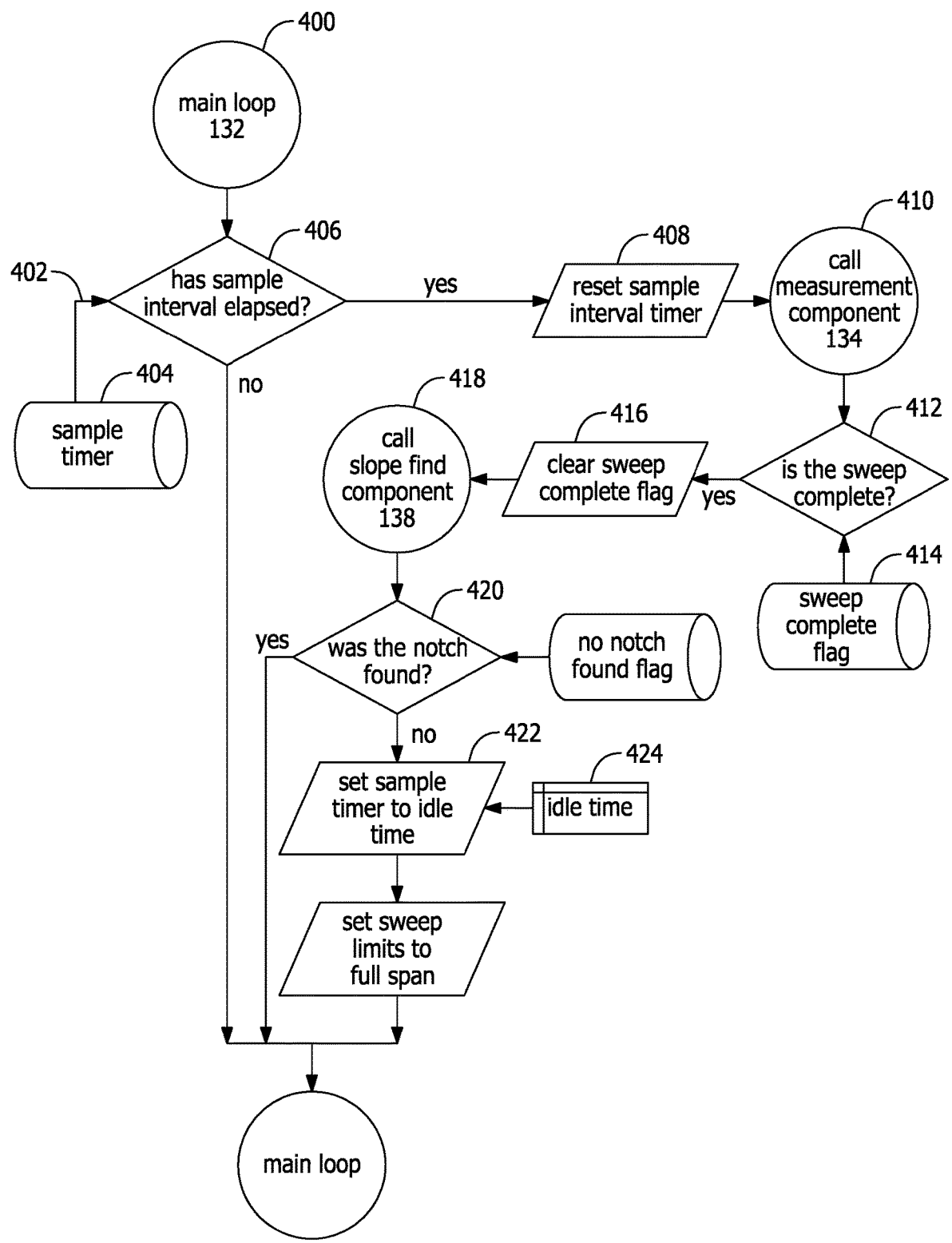

FIG. 4 is a flowchart of main program component 132. In the example embodiment, main program component 132 begins at step 400. A sample interval 402 is loaded from a sample timer memory location 404. Decision block evaluates whether sample interval 402 has elapsed. If "no," main program component 132 loops around to check whether sample interval 402 has elapsed. If "yes," the sample interval timer is reset 408 and measurement component 136 is called 410 (see FIG. 5). Decision block 412 checks if the sweep of voltage or current is complete using input from a sweep complete flag memory location 414. The sweep complete flag is cleared 416 and slope find component 138 is called 418. Decision block 420 checks whether a notch was found. If "yes" main program component 132 loops around to check whether sample interval 402 has elapsed. If "no," sample timer memory location 404 is set 422 to idle time, which is received from an idle time memory location and the sweep limits, upper range limit 309 and lower range limit 310 are set to full span and main program component 132 loops around to check whether sample interval 402 has elapsed. If the notch is not found during a sweep, it means that the balance point has shifted so much since the last sweep that the notch now lies outside the bounds of the current sweep limits. Upper range limit 309 and lower range limit 310 are shifted to encompass the entire sweep span in an attempt to locate the new position of the balance point.

Figure 5:
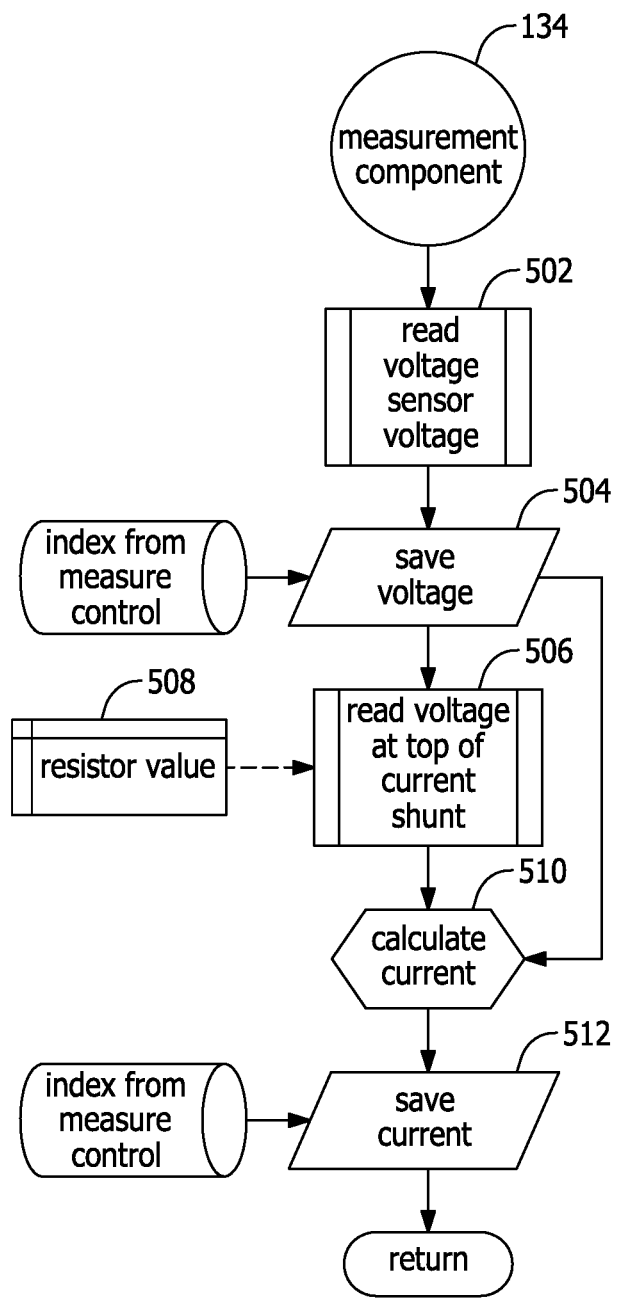

FIG. 5 is a flowchart of a measurement component 134. At block 502 a voltage at voltage sensor 118 is read and then stored at block 504. At block 506 the voltage at current sensor 116 is read. The voltage stored at block 504 and the voltage read from current sensor 116 and a value of resistor 204 retrieved from memory location 508 are used to calculate 510 the current being supplied to anode 102. The calculated current value is saved 512 and measurement component 134 returns program control to main program component 132.

Figure 6:
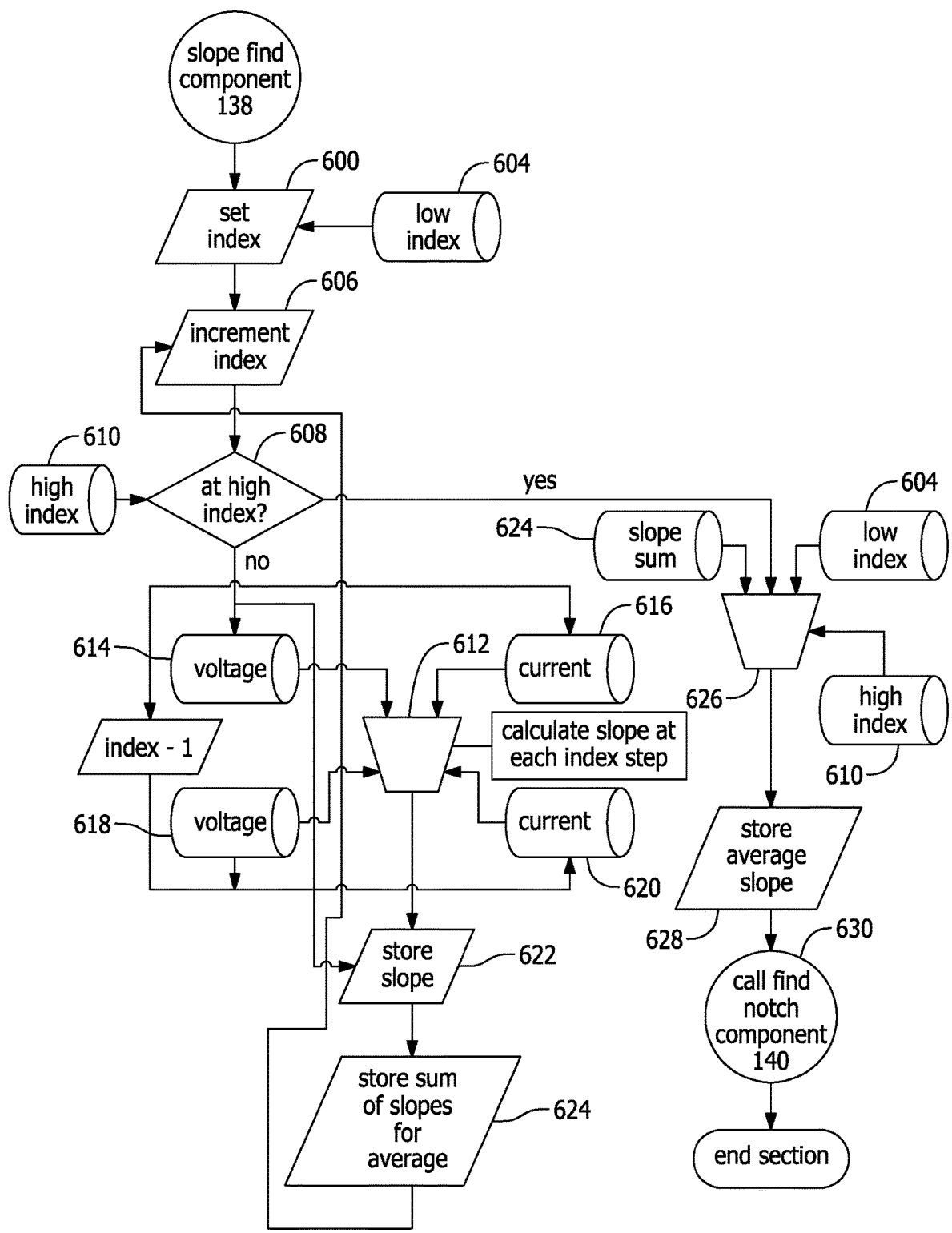

FIG. 6 is a flowchart of a slope find component 138. At block 600 an index is set to a low index from a low index memory location 604. The index is incremented at block 606. Decision block 608 determines whether the index has been incremented to a high index value 610. If "no," the slope at the current index step is determined at operation block 612 using a current voltage value 614 and a current current value 616 and a previous voltage value 618 and a previous current value 620. The current slope is stored 622 and a sum of the slopes is also stored 624 for calculated an average slope. Measurement control component 136 then loops back to increment the index at block 606 and to check whether the index has been incremented to a high index value 610. If "yes," measurement control component 136 determines an average slope at operation block 626 using slope sum 624, low index 604 and high index 610. The average slope is stored and find notch component 140 is called 630.

Figure 7:
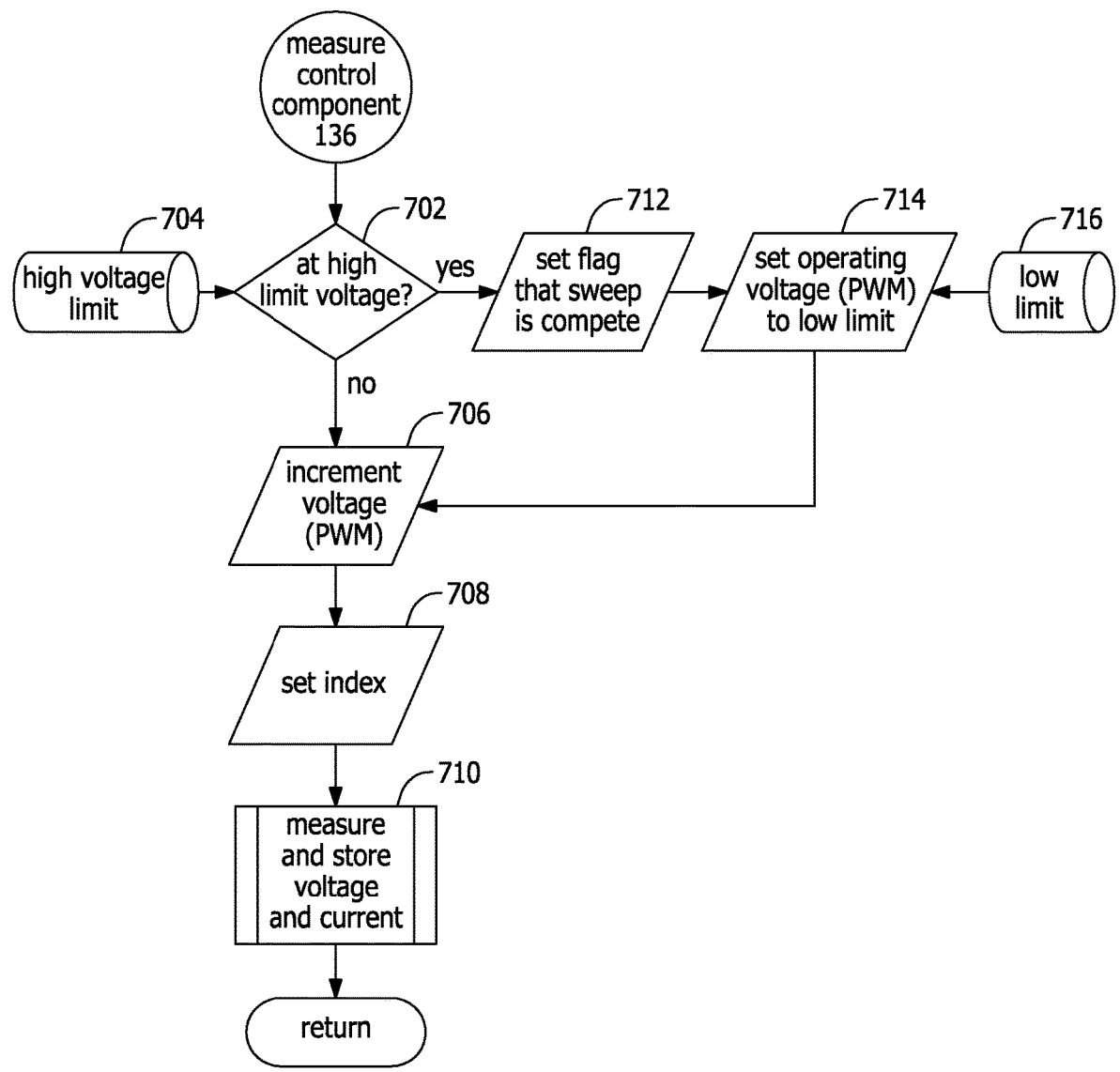

FIG. 7 is a flowchart of a measurement control component 134. At block 702, measurement control component 134 determines whether voltage 118 is at a high voltage limit 704. If "no," measurement control component 134 increments 706 a voltage of PWM electrical supply 200 (shown in FIG. 2), sets an index 708, and measures and stores the current voltage value and the current current value at block 710 before returning to the calling component. If "yes," measurement control component 134 sets a sweep complete flag, sets 714 the operating voltage to a low limit 716 and continues executing at block 706.

Figure 8:
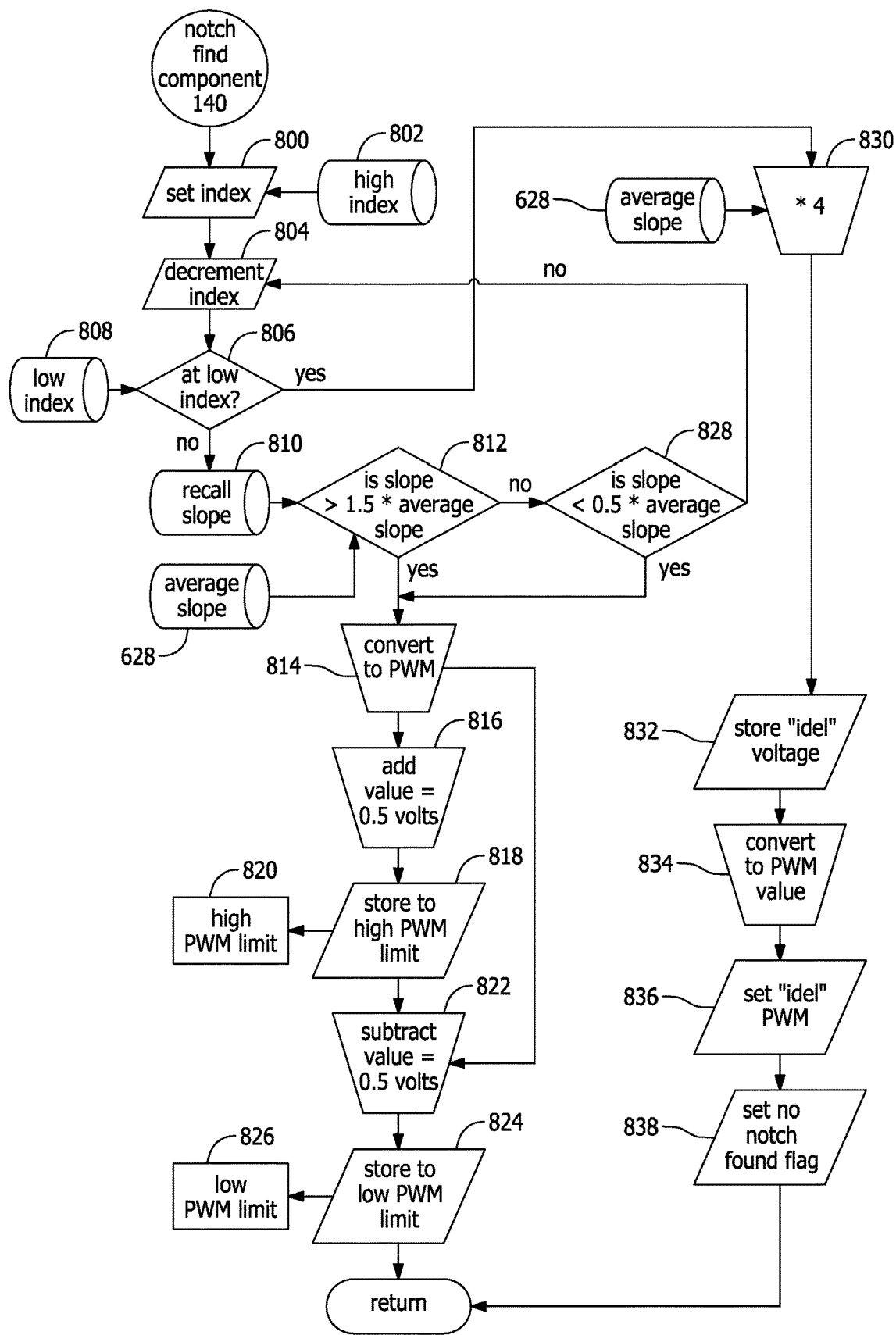

FIG. 8 is a flowchart of a notch find component 140. At block, notch find component 140 sets 800 an index to a high index value 802. At block 804, notch find component 140 decrement the index and then checks 806 whether the index is at a low index value 808. If "no," the slope is recalled at block 810 and compared 812 to the average slope 628 (shown in FIG. 6). If the slope is greater than 1.5 times the average slope, a notch is indicated and the slope is converted 814 to a PWM value. One-half Volts are added 816 to the PWM value and stored 818 as a high PWM limit 820. One-half Volts are subtracted 822 from the PWM value and stored 824 as a low PWM limit 826. Control of the execution of notch find component 140 is then returned to the calling component.

If at block 812, the slope is determined to be less than or equal to 1.5 times the average slope, the slope is checked 828 to determine whether the slope is less than one-half of the average slope. If "no," program control of notch find component 140 loops back to block 804 to inspect the next slope for evidence of a notch. If "yes," at block 828, program control of notch find component 140 continues execution at block 814. If, at block 806, it is determined that the index is at low index value 808, average slope 628 is multiplied 830 by 4.0 and an idle voltage is stored 832. The "idle" voltage is converted 834 to a corresponding PWM value and PWM value is set 836 in the PWM electrical supply 200. A no notch flag is set 838 and program control is returned to the calling component.

Because these methods only rely on changes in slope, precise or calibrated measurement of voltage and current is not required. There are no critical timings. There is no requirement to cease current flow to take measurements. This allows the use of simple and inexpensive circuitry and reduced software complexity. Measurement operational amplifiers (Op Amps) are not required. A single drive transistor, series limit current measurement resistor and various divider networks are all that is required to interface to the microprocessor. A linear relationship between processor drive and applied voltage is not required. Use of a continuously variable balance point eliminates potential difficulties in categorizing water and tank conditions to either of two setpoints.

FIGS. 4-8 are examples only and are not intended to be restrictive. Other data flows may therefore occur in cathodic protection system 100 and the illustrated events and their particular order in time may vary. Further, the illustrated events may overlap and/or may exist in fewer steps. Moreover, certain events may not be present and additional and/or different events may be included.

Cathodic protection system 100 may include or be communicatively coupled to any devices capable of receiving information from the network 142. The user access or client devices 150 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The client devices 150 can also include various other elements, such as processes running on various machines.

Network 142 may include any element or system that facilitates communications among and between various network nodes or devices, such as server 148 and/or client devices 150. Network 142 may include one or more telecommunications networks, such as computer networks, telephone or other communications networks, the Internet, etc. Network 142 may include a shared, public, or private data network encompassing a wide area (e.g., WAN) or local area (e.g., LAN). In some implementations, network 142 may facilitate data exchange by way of packet switching using the Internet Protocol (IP). Network 142 may facilitate wired and/or wireless connectivity and communication.

For purposes of explanation only, certain aspects of this disclosure are described with reference to the discrete elements illustrated in FIG. 1. The number, identity and arrangement of elements in environment 146 are not limited to what is shown. For example, environment 146 can include any number of geographically-dispersed user access devices, including server 148 and client devices 150 associated with other cathodic protection systems 100, which may be discrete, integrated modules or distributed systems. Similarly, environment 146 is not limited to a single cathodic protection system 100 and may include any number of integrated or distributed cathodic protection systems 100 or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

The one or more memory devices 128 store information within controller 124 or maybe communicatively accessible with one or more processors 126 through environment 146. The one or more memory devices 128 can be implemented as one or more of a computer-readable medium or media, a volatile memory unit or units, or a non-volatile memory unit or units. Expansion memory may also be provided and connected to controller 124 through an expansion interface, which may include, for example, a SIMM (Single In Line Memory Module) card interface. Such expansion memory may provide extra storage space for controller 124, or may also store applications or other information for controller 124. Specifically, the expansion memory may include instructions to carry out or supplement the processes described above, and may include secure information also. Thus, for example, the expansion memory may be provided as a security module for controller 124, and may be programmed with instructions that permit secure use of controller 124. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the one or more memory devices 128, the expansion memory, or memory on one or more processors 126 that may be received, for example, over network 142.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including one or more processors 126, which may be special or general purpose, coupled to receive data and instructions from, and to transmit data and instructions to, a storage system, such as, but not limited to one or more memory devices 128, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal"

refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network such as, but not limited to network 142 and/or the Internet 144. The relationship of client and server arises by virtue of computer programs running on the respective computers and having a client-server relationship to each other.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", "processor," etc. are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by one or more processors 126 and by devices that include, without limitation, mobile devices, clusters, personal computers, workstations, clients, and servers, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) varying an electrical power input driving the powered anode through a range of values of a first electrical parameter, the range defined by an upper range limit and a lower range limit, (b) measuring a current value of a second electrical parameter of the electrical power input during the varying, (c) determining a slope between the measured current values of the first and corresponding second electrical parameters and measured previous values of the first and second electrical parameters, (d) comparing the determined slope to a predetermined slope threshold range, and (e) applying the current value of a first electrical parameter to the electrical power input when a discontinuity in the slope is determined. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules or components, to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules or components may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a system and method of efficiently driving an anode in a cathodic protection system provides a cost-effective and reliable means for driving the anode at an optimum current and voltage level for the conditions in the vessel. More specifically, the methods and systems described herein facilitate using an electrical response of the anode during changing conditions to continually hunt for the optimum operating point and modifying the electrical supply to meet that operating point and adapting to varying water and tank conditions due to seasonality, time that water has sat in the tank and the tank's age. In addition, the above-described methods and systems facilitate supplying enough electrical power to the anode to provide cathodic protection, but not too much electrical power so as to generate dissociated gases, such as, but not limited to hydrogen and sulfide gases. As a result, the methods and systems described herein facilitate providing cathodic protection in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

What is claimed is:

1. A method of controlling a powered anode providing cathodic protection in a vessel, the method comprising:
   varying an electrical power input driving a powered anode through a range of values of a first electrical parameter, the range defined by an upper range limit and a lower range limit;
   measuring values of a plurality of electrical parameters of the electrical power input during the varying;

plotting a trace of values of a first electrical parameter of the plurality of electrical parameters of the electrical power input with corresponding values of a second electrical parameter of the plurality of electrical parameters of the electrical power input;

determining a slope of the trace at a plurality of points on the trace;

identifying a discontinuity on the trace; and applying the electrical power input that corresponds to the identified discontinuity to the powered anode to provide cathodic protection to the vessel.

2. The method of claim 1, wherein identifying a discontinuity on the trace comprises identifying a point on the trace where at least one of a change in a value of the slope exceeds a predetermined slope threshold range and a change of polarity of the value of the slope occurs.

3. The method of claim 2, further comprising when at least one of a change in the value of the slope is within the predetermined slope threshold range and a change of polarity of the value of the slope does not occur, modifying at least one of the upper range limit and the lower range limit such that a difference between the at least one of the upper range limit and the lower range limit is increased.

4. The method of claim 2, wherein applying the electrical power input of a first electrical parameter to the electrical power input comprises applying the electrical power input of a first electrical parameter to the electrical power input when at least one of a change in a value of the slope exceeds the predetermined slope threshold range and a change of polarity of the value of the slope occurs.

5. The method of claim 1, wherein applying the electrical power input that corresponds to the identified discontinuity comprises applying the electrical power input that corresponds to a point on the trace where at least one of a change in a value of the slope exceeds a predetermined slope threshold range and a change of polarity of the value of the slope occurs.

6. The method of claim 1, wherein varying the electrical power input comprises modifying at least one of the upper range limit and the lower range limit such that a difference between the applied electrical power input and at least one of the upper range limit and the lower range limit is reduced.

7. The method of claim 1, wherein varying the electrical power input comprises modifying at least one of the upper range limit and the lower range limit such that a difference between the at least one of the upper range limit and the lower range limit is reduced.

8. A powered anode drive control system for providing cathodic protection comprising:

an anode drive power supply;

a powered anode positionable in a fluid-filled vessel and electrically couplable to the anode drive power supply; and an anode drive controller comprising one or more processors communicatively coupled to one or more memory devices, the one or more processors communicatively couplable to an anode drive current sensor and an anode drive voltage sensor communicatively coupled to the anode drive controller and the anode drive power supply, the one or more processors configured to:

vary an electrical power input driving the powered anode through a range of values of a first electrical parameter, the range defined by an upper range limit and a lower range limit;

measure a current value of a second electrical parameter of the electrical power input while the electrical power input is being varied;

determine a slope between the measured current values of the first and corresponding second electrical parameters and measured previous values of the first and second electrical parameters;

compare the determined slope to a predetermined slope threshold range; and apply the current value of a first electrical parameter to the electrical power input when at least one of a change in a value of the slope exceeds the predetermined slope threshold range and a change of polarity of the value of the slope occurs to provide cathodic protection to the fluid-filled vessel.

9. The powered anode drive control system of claim 8, wherein the one or more processors are further configured to vary an electrical power input driving the powered anode between an upper range limit and a lower range limit.

10. The powered anode drive control system of claim 8, wherein the one or more processors are further configured to modify at least one of the upper range limit and the lower range limit such that a difference between the applied current value and at least one of the upper range limit and the lower range limit is reduced.

11. The powered anode drive control system of claim 8, wherein the one or more processors are further configured to when at least one of the change in the value of the slope is within the predetermined slope threshold range and a change of polarity of the value of the slope does not occur, modify at least one of the upper range limit and the lower range limit such that a difference between the at least one of the upper range limit and the lower range limit is increased.

12. The powered anode drive control system of claim 8, wherein a discontinuity in the slope comprises a change in a value of the slope that exceeds a predetermined slope threshold range and a change of polarity of the value of the slope occurs.

13. The powered anode drive control system of claim 12, wherein the one or more processors are further configured to:

determine an average value of the slope between the measured current values of the first and corresponding second electrical parameters and measured previous values of the first and second electrical parameters while the electrical power input driving the powered anode is varied between the upper range limit and the lower range limit; and store the average slope value for use in locating a discontinuity in the slope.

\* \* \* \* \*